UNITED STATES PATENT OFFICE.

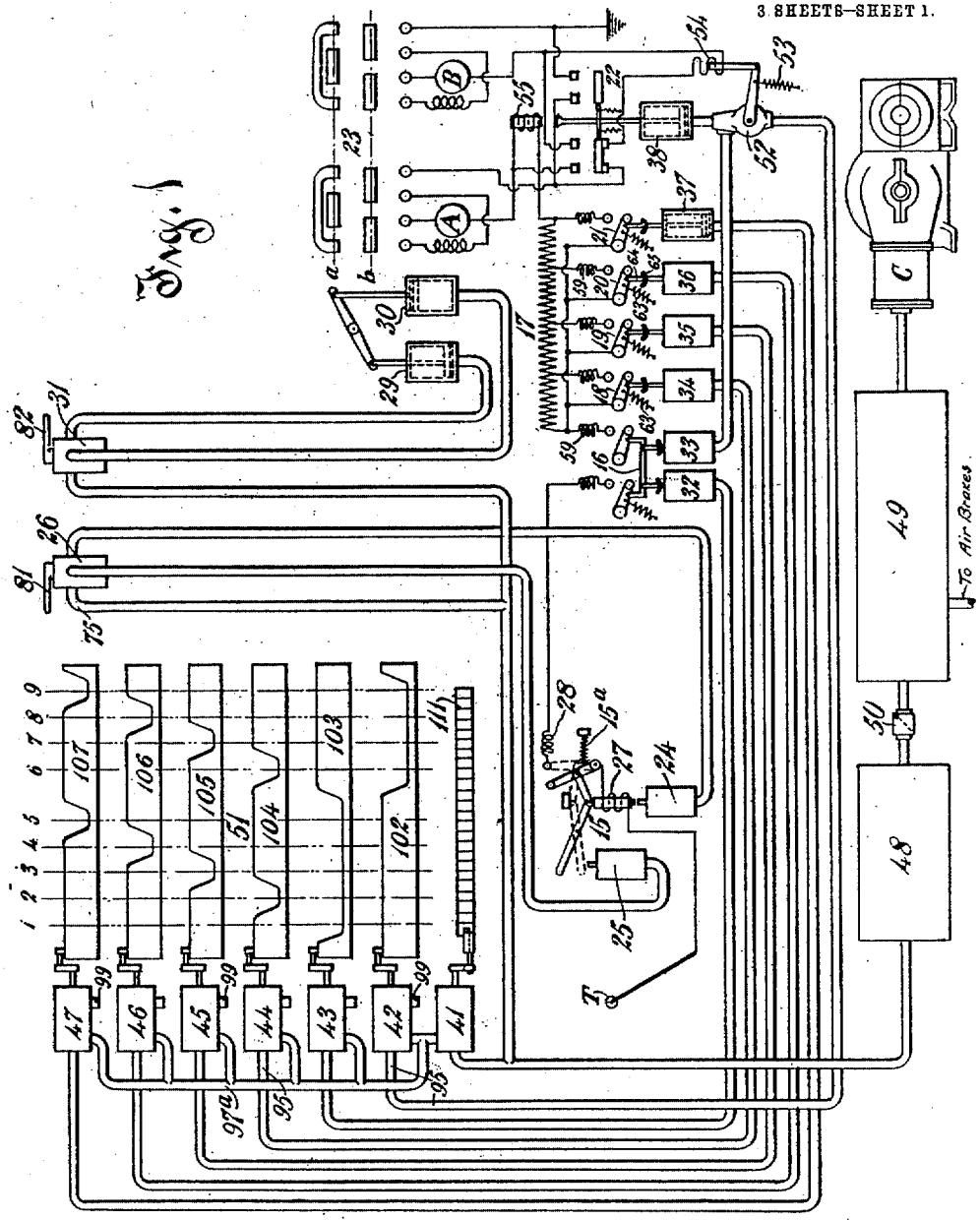

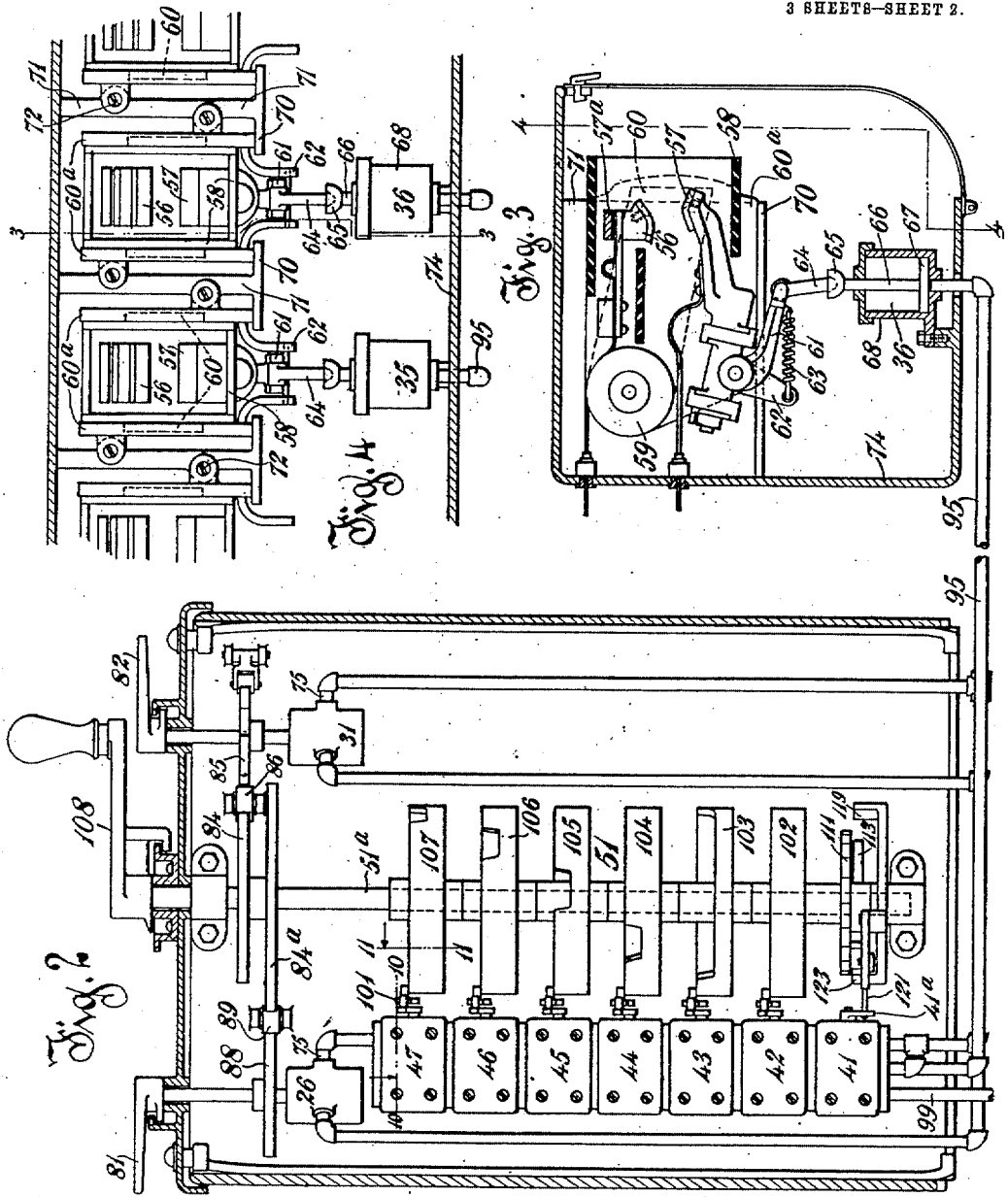

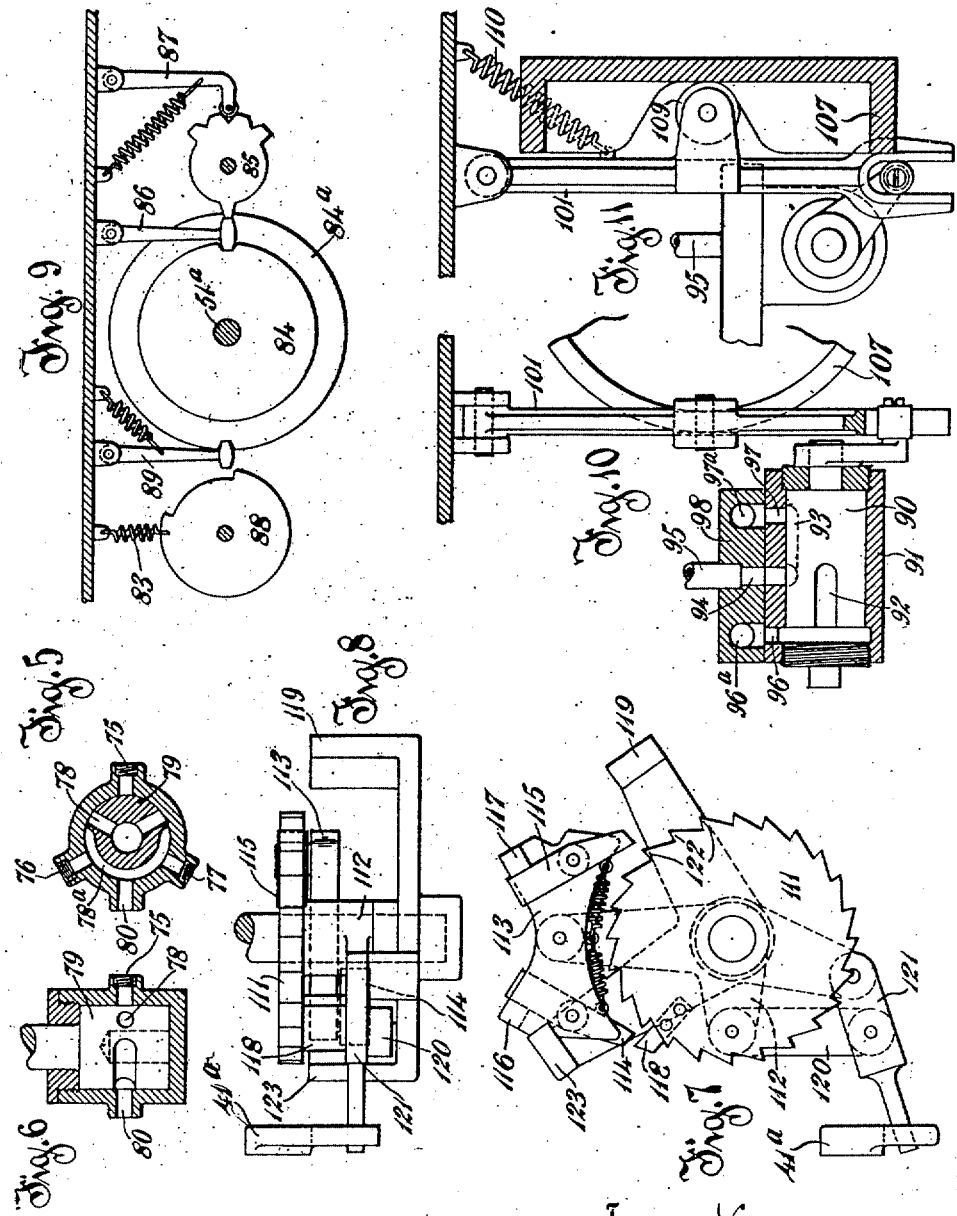

EMMETT W. STULL, OF NORWOOD, OHIO, ASSIGNOR TO ALLIS-CHALMERS COMPANY, A CORPORATION OF NEW JERSEY.

MOTOR-CONTROL SYSTEM.

982,897.  Specification of Letters Patent.  Patented Jan. 31, 1911.

Application filed April 10, 1908. Serial No. 426,230.

*To all whom it may concern:*

Be it known that I, EMMETT W. STULL, a citizen of the United States, residing at Norwood, in the county of Hamilton and State of Ohio, have invented certain new and useful Improvements in Motor-Control Systems, of which the following is a full, clear, and exact specification.

My invention relates to motor control systems, especially those of the remote control type.

In the modern development of the electric railway the units have greatly increased in size, and now it is common to use several large motors, generally four, on each car. As the motors have increased in number and in size it has in some instances become undesirable to control the currents therefor directly by means of a manually operated controller on the car platform. For this reason, various remote control systems have been devised in which a manually operated controller controls the operation of a main or motor controller and the latter controls the currents.

It is the object of my present invention to improve upon the remote control systems hitherto known and to provide a system which shall be free from the objections to which many of such systems are subject.

The various novel features of my invention will be apparent from the description and drawings and will be specifically pointed out in the claims.

Figure 1 shows a diagram of a system constructed and arranged in accordance with my invention; Fig. 2 is an elevation of the master controller, the controller casing being in section; Fig. 3 is a vertical section through one of the pneumatically operated contact switches, taken approximately on the line 3—3 of Fig. 4; Fig. 4 is a section on the line 4—4 of Fig. 3; Figs. 5 and 6 are horizontal and vertical sections through the master reverser or the master cut-off; Figs. 7 and 8 are a plan and a front elevation respectively of the operating mechanism of the main supply valve; Fig. 9 is a somewhat diagrammatic representation of the interlocking mechanism between the master speed controller and the master cut-off and the master reverser; and Figs. 10 and 11 are sections on the lines 10—10 and 11—11 respectively of Fig. 2.

The motors A and B are supplied with current from a trolley or other collecting device T, through the main cut-off switch and circuit-breaker 15, the double circuit-closing switch 16, the sectional resistance 17 or such part of it as is not short-circuited by the resistance switches 18, 19, 20, and 21, the series-parallel switch 22, and the reversing switch 23. The switch 15 is closed by the pneumatic actuator 24 and tripped by the pneumatic actuator 25, these two actuators being controlled by the master cut-off 26. The cut-off switch 15 may also be tripped by the overload coil 27. This switch is provided with a spring 15ª for causing a quick break, and with a blow-out coil 28. The reversing switch 23 is moved to its two positions by pneumatic actuators 29 and 30 which are controlled by the master reverser 31. The switch 16 may be closed by either one of the pneumatic actuators 32 or 33, while the switches 18, 19, 20, and 21, may be closed and the switch 22 moved to parallel position by the pneumatic actuators 34, 35, 36, 37, and 38 respectively. The switches 16 to 21 inclusive are biased to open position and the switch 22 to series position. The pneumatic actuators 32 to 38 inclusive are controlled by valves 42 to 47 inclusive, these valves being arranged to connect the pipes which lead to the various actuators either to the atmosphere or to the air reservoirs 48 and 49 through the valve 41. The valve 41 when closed interrupts the supply of air to the valves 42 to 47, but does not connect them to the atmosphere.

The air pressure for all of the pneumatic actuators above referred to is supplied directly from the reservoir 48, which in turn is supplied from the reservoir 49 through a check valve 50 which prevents backward flow of air from the reservoir 48 to the reservoir 49. The reservoir 49 also supplies the air-brakes. A motor driven compressor C supplies air to the reservoir 49. The auxiliary reservoir 48 and check valve 50 are provided so that in case of an accident of any sort to the reservoir 49, the air-brake system or the compressor, enough air will be saved in the reservoir 48 to allow the car or train to be brought in to the car barn or at least to a siding.

The valves 41 to 47 inclusive are controlled by the rotatable drum 51, and with it form the master speed controller. The valve 41 controls the supply of air for the valves 42 to 47 inclusive, and can thus be termed the main supply valve. In the supply pipe for the actuators 33 and 38 is a valve 52, which is biased to open position by a spring 53, but which is moved to closed position by the magnet 54 whenever the motor circuit is closed with the motors in series. By this means the series-parallel switch 22 is prevented from being moved from series to parallel position save when the circuit is open. A magnet 55 in the main motor circuit holds the switch 22 when it is in parallel position in such position until the circuit has been broken elsewhere. Thus the circuit is never broken at the series-parallel switch.

The construction of the individual contactors and their actuators is shown in Figs. 3 and 4. Each of these contactors consists of a fixed spring-mounted contact 56 and a pivoted contact 57, these two contacts being located in a blow-out chute of insulating material 58 which is open at the end to allow any arc which might be formed at the opening of the switch to be blown outward by the blow-out coil 59. The poles 60 of the blow-out coil embrace the blow-out chute on either side, being located in slots in the frame 60$^a$ of brass or other non-magnetic material. The contact 56 is preferably arranged to abut against a stop 57$^a$ when the contactor is closed. The movable member 57 of the switch has a downwardly extending arm 61, between which and a pin between downward extensions 62 from the frame 60$^a$ a spring 63 extends for biasing the movable contact to open position. The lower end of a pin 64, which is pivotally attached to the arm 61, normally rests in a cup 65 at the upper end of the piston rod 66 of the pneumatic actuator. The piston 67 of this actuator fits tightly within the cylinder 68, while the pipe 95 from the master controller leads into the cylinder 68 below the piston 67. The pneumatic actuators are arranged in a row or rows in the bottom of a casing 74, while the contactors actuated thereby are arranged in stalls in the upper part of the casing, where they are supported on shelves 70 which extend laterally from the partitions 71 between these stalls. The contactors may be fastened in place by screws 72 which extend through lugs on the frame 60$^a$ into lugs on the partitions 71. By removing its screws 72, any contactor can be individually removed from its stall and repaired or replaced by another. The arms 61 and 62 extend downward between the shelves 70. The contactor just described is used complete for the switches 16, 18, 19, 20, and 21, while the pneumatic actuators 24, 25, 29, 30, and 38 are substantially identical with the actuator just described.

The construction of the master cut-off and the master reverser valves 26 and 31 is shown in detail in Figs. 5 and 6, these two valves being substantially identical. In each of these the opening 75 leads to the reservoir 48 and may be connected to either one of the openings 76 or 77 by means of the passageway 78 in the rotatable part 79 of the valve. The two openings 76 and 77 are respectively connected by pipes to the two actuators under the control of the valve. Each of these openings may also be connected to the atmosphere through the passageway 78$^a$ and the opening 80, and is so connected save when the rotatable member 79 is in position to connect it to the inlet 75. The two valves 26 and 31 are operable by handles 81 and 82 respectively, which may or may not be removable as desired. By means of a spring 83 (see Fig. 9), the valve 26 is biased to the position in which it is shown in Fig. 5, with both openings 75 and 76 connected to the atmosphere. By moving this valve to its extreme positions, the cut-off switch 15 may be set or tripped as desired, this latter switch remaining in the position in which it was put after the actuating force is removed. This allows the overload tripping magnet 27 of the cut-off switch and circuit-breaker 15 to tip the latter without being interfered with by the actuator 24. The master reverser 31 may be left in either extreme position in which it is put in order to indicate the position of the main reversing switch 23. This latter will also stay in either position in which it is put, even though the master reverser is returned to off position. By moving the valve 31 to its two positions the two actuators 29 and 30 may be respectively operated. The master reverser is interlocked with the main drum 51 of the master controller by means of notched disk 84 on the shaft 51$^a$ of said drum, a notched plate 85 on the shaft of the reverser, and a swinging arm 86 between them, as shown in Fig. 9. By means of this interlocking mechanism the master reverser can be thrown from one position to another only when the main drum 51 is in off position, and the main drum can not be moved from off position when the master reverser is in its middle position. If desired the latter feature of this interlock may be omitted. A spring-pressed arm 87 coöperates with the notched plate 85 to prevent the master reverser from remaining in any intermediate position. There is also an interlock between the drum 51 and the master cut-off 26. This interlock comprises the notched disk 84$^a$ on the shaft 51$^a$ of the drum 51, the notch plate 88 on the shaft of the master cut-off 26, and the swinging arm 89 between them. By means of this interlock, the drum 51 can not be moved when the master cut-off 26 is in "set" position, while said master cut-off can not be moved to "set" position save when the drum 51 is in off position. However, the master cut-off can be moved to "trip" position for any position of the drum 51.

Each of the valves 41 to 47 inclusive consists of a rotatable member 90 located in a casing 91. The member 90 of each of the valves 42 to 47 has two passageways 92 and 93, which in the two positions of the valve connect that opening 94 in the casing which leads to an actuator of the main controller through the pipe 95, either to the atmosphere through the opening 96 or to the source of air supply through the opening 97 in the casing. In the valve 41, however, either the passageway 92 or the opening 96 or both are omitted, while the pipe 95 leads to the reservoir 48. The openings 96 of the valves 42 to 47 inclusive are connected by a longitudinal passageway 96$^a$ in the plate 98, and exhaust below the car floor through a pipe 99. The openings 97 of the valves 41 to 47 inclusive, are connected by a longitudinal passageway 97$^a$ in the plate 98, whereby the valve 41 controls the supply of air to the valves 42 to 47 inclusive.

The valves 42 to 47 inclusive are operated by arms 101 pivoted on the casing of the master controller, and these arms are operated by notched rings 102 to 107 inclusive. These notched rings form the drum 51, and are rotated as a unit by means of a handle 108 which is preferably removable only when the drum 51 is in off position. Rollers 109 on the arms 101 rest on the upper edges of the rings 102 to 107 inclusive, and as the drum 51 is rotated the arms 101 move downward or upward as the notches of the proper rings come under and pass from under the various rollers 109. Springs 110 may be provided to make sure that the rollers 109 will follow the upper surface of the rings 102 to 107 promptly and accurately. When the arm 101 of any valve is down, the roller 109 being in the notch of its associated ring, that valve is open; the raising of the arm 101 as the notch passes from under the roller 109 operates to close the valve.

The valve 41 is operated by means of a toothed disk 111 on the shaft 51$^a$ of the drum 51. An arm 112 is loosely mounted on the shaft of said drum and carries a swinging cross-bar 113, the latter carrying two pivoted dogs 114 and 115, the inner ends of which are spring-pressed toward each other but which are limited in this movement by stops 116 and 117. When the drum 51 is in off position, the arm 112 is in the position shown. Forward movement of the drum causes engagement between the lug 118 and the dog 114 and carries the arm 112 clockwise until the bar 117 strikes the stop 119, which causes the cross bar 117 to be turned to disengage the dog 114 from the lug 118 and move the inner end of the dog 115 into the path of the teeth of the disk 111. As the arm 112 is thus moved, it operates through the link 120 and arms 121 and 41$^a$ to open the valve 41. When the controller is now moved backward from any position, one of the teeth 122 on the disk 111 engages the dog 115 and through it forces the arm 112 counter-clockwise until the cross arm 17 strikes the stop 123, the latter then turning said cross-arm to disengage the dog 115 from the tooth with which it was in engagement and move it out of the path of any other of such teeth, and also to move the dog 114 into the path of the lug 118. This counter-clockwise movement of the arm 112 closes the valve 41. Since the dogs 114 and 115 are pivoted on the cross-arm 117, engagement of the dog 115 and the disk 111 has no effect during the forward movement of the drum 51, nor of the dog 114 and lug 118 during the backward movement thereof.

The operation of the system is as follows:—The cut-off switch and circuit-breaker 15 is set, if it is not already set, by proper movement of the master cut-off 26 to admit air to the actuator 24, the master cut-off being returned by the spring 83 to its neutral position as soon as it is released by the operator. The reversing switch 23 is moved to the desired position, if it is not already in such position, by proper movement of the master reverser 31 to admit air to the actuator 29 or 30. The series-parallel switch 22 is in its normal or series position. Because of the interlocking mechanism, the drum 51 can not be moved out of its off position until the master cut-off is in its neutral position and the master reverser in either "ahead" or "back" position, while the master cut-off can not be moved to "set" position or the master reverser from one position to another unless the drum 51 is in its off position. Upon movement of the drum 51 by the handle 108 into its first position, the valve 41 is turned by the action of the disk 11, lug 118, pawl 114, and arm 112 to admit air into the passageway 97$^a$. The notch in the ring 103 allows the valve 43 also to open at this time to admit air from the passageway 97$^a$ into the pipe 95 leading to the actuator 32, whereupon the latter closes the double switch 16 and completes the motor circuit through the resistance 17. Upon movement of the drum 51 into its second position, the valve 44 is turned to admit air from the passageway 97$^a$ to the pipe leading to the actuator 34, whereupon the latter closes the switch 18 to cut out one section of the resistance 17. In positions 3, 4, and 5 of the drum 51 the valves 45, 46, and 47 are successively moved by the action of the arms 101 and the notched rings 105, 106, and 107 to admit air successively to the pipes leading to the actuators 35, 36, and 37, causing the latter to close the switches 19, 20, and 21 successively to cut out the remaining sections of the resistance 17. As soon as one resistance switch, say 21, is closed, the valve controlling the actuator of the preceding switch, say 20, is moved to a position to connect the pipe leading to such actuator to the passageway 96ª and the atmosphere, thus allowing each resistance switch to open as soon as the succeeding resistance switch closes. When the drum 51 is moved from position 5 to position 6, the valves 47 and 43 are operated, preferably successively, to connect their associated actuators to the atmosphere through the passageway 96ª, thus allowing the switches 21 and 16 to open successively. During this same movement of the drum 51, the valve 42 is operated to connect the pipe leading to the valve 52 to the reservoir 48, through the passageway 97ª and valve 41. However, the valve 52 is closed, being held so by the magnet 54, and remains so until the switch 16 is opened to break the motor circuit and deenergize the magnet 54. The spring 53 then opens the valve 52 and admits air to the actuators 38 and 33. The actuator 38 at once moves the switch 22 to its parallel position, while the actuator 33 again closes the double switch 16, thus again completing the motor circuit through the resistance 17 but with the motors now connected in parallel. In position 6 the valve 44 is also operated to cause the actuator 34 to close the switch 18 to cut out one section of the resistance 17. As the drum 51 is moved forward to positions 7, 8, and 9, the valves 45, 46, and 47 are again successively operated to cause the successive closing of the switches 19, 20, and 21 to cut out the remaining sections of the resistance 17. Should an overload occur at any time either in the starting or in the normal running of the motors, the overload magnet 27 will trip the circuit-breaker 15 to break the motor circuit. The interlocking mechanism 84ª, 88, and 89 between the drum 51 and the master cut-off 26 prevents the operation of the valve 26 to close the switch 15 again, until the drum 51 has been moved back to off position. This interlocking mechanism, however, allows the operation of the master cut-off 26 at any time to supply air to the actuator 25 to trip the circuit-breaker 15. This latter action, however, is ordinarily only used in emergencies. When the drum 51 is moved backward from any position, one of the teeth 122 on the disk 111 engages the pawl 115 and moves the arm 112 to close the valve 41, thus preventing further supply of air to the actuators 32 to 38 inclusive. This backward movement at once also connects the proper one of the valves 44 to 47 inclusive to the atmosphere to cause the opening of that one of the resistance switches 18 to 21 inclusive which is closed, thus inserting the entire resistance 17 into the motor circuit. Because the valve 41 is closed, the switches 18, 19, and 20 are not moved to closed position as the drum 51 is moved backward.

If the motors are connected in series, the switch 16 is opened when the drum 51 is moved backward to off position to connect the actuator 32 to the atmosphere through the valve 43. However, if the motors are connected in parallel, the double switch 16 then being held closed by the actuator 33, the switch 16 will open to break the motor circuit when the drum has moved backward beyond position 6, when the valve 42 is moved to discharge into the atmosphere the air in the actuators 33 and 38. By thus inserting the resistance 17 in circuit before the circuit is opened, the breaking of the circuit is cushioned to some extent. Although the valve 42 discharges the air from the actuator 38 at the same time that it does from the actuator 33, the series-parallel switch 22 will remain in its parallel position until after the switch 16 has opened, being held there by the magnet 55. After the valve 41 has been operated to disconnect the passageway 97ª from the reservoir, it can not again be moved to connect said passageway to the reservoir 48 until after the drum 51 has been moved to off position, as not until then is the lug 118 in position to engage and move the pawl 114. Thus after any backward movement of the drum 51, the resistance 17 can not be cut out by any forward movement thereof, and if such backward movement of the controller started from one of the parallel positions and brings the drum back of position 6 to cause opening of the motor circuit, the latter can not again be closed by a forward movement until the drum 51 has been brought to off position. After it has been so brought to off position, it can again be moved forward to cause the operation of the actuators in the sequence above described.

Although for simplicity I have shown my invention with only one master controller and one main controller and set of motors, it is obvious that by properly branching the pipes 95 there may be any desired number of either. For each of the motors A and B, a group of motors may be substituted and indeed for many purposes the controller may be arranged to make other connections than the simple series-parallel connections shown.

Many modifications in the precise arrangement shown and described may be made without departing from the spirit and scope of my invention and all such I aim to cover in the following claims.

What I claim as new is:—

1. In combination, main and auxiliary reservoirs, the latter being supplied with fluid pressure from the former, means for preventing flow of fluid from the auxiliary reservoir to the main reservoir, an airbrake system supplied from the main reservoir, and a fluid-actuated motor-controlling means supplied from the auxiliary reservoir.

2. In a motor control system, a motor, a circuit-breaker in the circuit thereof, means for automatically tripping said circuit-breaker upon abnormal conditions in the motor circuit, and fluid pressure operated means manually controlled from a remote point for tripping and setting said circuit-breaker.

3. In a motor control system, a plurality of motors, means for connecting said motors in series and in parallel, a switch for completing the motor circuit, one means for closing said switch when the motors are connected in series, and another means for closing said switch when the motors are connected in parallel.

4. In a motor control system, a plurality of motors, means for connecting said motors in series and in parallel, a switch for closing the motor circuit, and two independent remotely-controlled means for closing said switch when the motors are connected in series and in parallel respectively.

5. In a motor control system, a plurality of motors, means for connecting said motors in series and in parallel, a switch for closing the motor circuit, and two independent remotely-controlled fluid-actuated means for closing said switch when the motors are connected in series and in parallel respectively.

6. In a motor control system, the combination of a motor, a plurality of controlling switches therefor, fluid-actuated means for operating said switches, a set of valves for controlling the supply of fluid to said fluid-actuated means, a main supply valve for controlling the supply of fluid to said first mentioned valves, and unitary means for operating all of said valves.

7. In a motor control system, the combination of a motor, a plurality of controlling switches therefor, fluid-actuated means for operating said switches, a set of valves for controlling the supply of fluid to said fluid-actuated means, a main supply valve for controlling the supply of fluid to said first mentioned valves, and unitary means for operating all of said valves, and arranged to open said main supply valve upon any forward movement from off position.

8. In a motor control system, the combination of a motor, a plurality of controlling switches therefor, fluid-actuated means for operating said switches, a set of valves for controlling the supply of fluid to said fluid-actuated means, a main supply valve for controlling the supply of fluid to said first mentioned valves, and unitary means for operating all of said valves, and arranged to close said main supply valve upon any backward movement from any position.

9. In a motor control system, the combination of a motor, a plurality of controlling switches therefor, fluid-actuated means for operating said switches, a set of valves for controlling the supply of fluid to said fluid-actuated means, a main supply valve for controlling the supply of fluid to said first mentioned valves, and unitary means for operating all of said valves, and arranged to open said main supply valve upon any forward movement from off position and to close said main supply valve upon any backward movement from any position.

10. In a motor control system, a plurality of motors, a switch for connecting said motors in series and in parallel, a switch for closing the motor circuit, separate means for varying the resistance of the motor circuit, and means for preventing said series-parallel switch from being moved to parallel position when the circuit-closing switch is closed.

11. In a motor control system, a plurality of motors, a switch for connecting said motors in series and in parallel, said switch being normally in series position, fluid-actuated means for moving said switch to parallel position, and means for preventing fluid from being supplied to said fluid-actuated means while the motor circuit is energized with the motors connected in series.

12. In a motor control system, a plurality of motors, a switch for connecting said motors in series and in parallel, said switch being normally in series position, a switch for closing the motor circuit, and a magnet in the motor circuit when the motors are connected in series for preventing said series-parallel switch from being moved from series to parallel position while the motor circuit is energized.

13. In a motor control system, a plurality of motors, a switch for connecting said motors in series and in parallel, said switch being normally in series position, and a magnet energized only while the motor circuit is energized with the motors connected in series for preventing said switch from being moved to parallel position unless the motor circuit is open.

14. In a motor control system, the combination of a plurality of motors, a switch for connecting said motors in series and in parallel, fluid-actuated means for moving said switch to parallel position, and means for preventing the initial supply of fluid to said fluid-actuated means unless the motor circuit is broken.

15. In combination, a plurality of motors, a switch for connecting said motors in series and in parallel, fluid-actuated means for moving said switch to parallel position, and a magnet in the motor circuit for holding said switch when in parallel position in such position until the motor circuit is broken elsewhere.

16. In a motor control system, a plurality of motors, a switch for connecting said motors in series and in parallel, said switch being normally in series position, and a magnet in the motor circuit for holding said switch when in parallel position in such position until the motor circuit is broken elsewhere.

17. In combination, a switch for an electric circuit, and fluid-actuated means for operating said switch, said switch in its entirety being removable separately from its actuating means.

18. In a control system, a casing, a plurality of switches mounted individually in stalls in said casing, and fluid-actuated means for actuating each of said switches, said switches being individually removable from said casing and said actuating means.

19. In combination, a circuit-breaker in the circuit thereof, fluid-actuated means for setting and tripping said circuit-breaker, and a valve for controlling the supply of fluid to said fluid-actuated means, said valve being biased to a position to shut off the supply of fluid to said fluid-actuated means.

20. In combination, a motor, a circuit-breaker in the circuit thereof, an overload tripping coil for said circuit-breaker, two independent fluid-actuated means for setting and tripping said circuit-breaker respectively, and a valve for admitting fluid-pressure to either one of said actuating means, said valve being biased to a position to shut off the supply of fluid to said fluid-actuated means.

21. In combination, a motor, speed controlling means therefor, a cut-off switch in the motor circuit, a master speed controller, a master cut-off for setting and tripping the cut-off switch, and an interlock between said master speed controller and said master cut-off for preventing the setting of said cut-off switch unless the master-speed controller is in off position.

22. In combination, a motor, speed controlling means therefor, a cut-off switch in the motor circuit, a master speed controller, a master cut-off for setting and tripping the cut-off switch, and an interlock between said master speed controller and said master cut-off for preventing the setting of said cut-off switch unless the master speed controller is in off position, while allowing said master cut-off to trip said main cut-off switch when the master speed controller is in any position.

23. In combination, a motor, speed controlling means therefor, a cut-off switch in the motor circuit, a master speed controller, a master cut-off for setting and tripping the cut-off switch, and an interlock between said master speed controller and said master cut-off for preventing said master speed controller from being moved out of off position when the master cut-off is in "set" position.

In testimony whereof I affix my signature, in the presence of two witnesses.

EMMETT W. STULL.

Witnesses:
  GEO. B. SCHLEY,
  FRED J. KINSEY.